(12) United States Patent
Sjostrom et al.

(10) Patent No.: US 11,413,987 B2
(45) Date of Patent: Aug. 16, 2022

(54) ELECTROMAGNETIC SEAT ATTACHMENT AND SEAT POWER

(71) Applicant: The Boeing Company, Chicago, IL (US)

(72) Inventors: Brett Dayton Sjostrom, Champlin, MN (US); Kenneth M. LaSalle, Marysville, WA (US); Jose A. Cantos, Brooklyn, NY (US)

(73) Assignee: The Boeing Company, Chicago, IL (US)

(*) Notice: Subject to any disclaimer, the term of this patent is extended or adjusted under 35 U.S.C. 154(b) by 395 days.

(21) Appl. No.: 16/558,420

(22) Filed: Sep. 3, 2019

(65) Prior Publication Data

US 2021/0061134 A1 Mar. 4, 2021

(51) Int. Cl.
*B60N 2/015* (2006.01)
*F16D 27/12* (2006.01)
*B60N 2/02* (2006.01)
*B64D 11/06* (2006.01)

(52) U.S. Cl.
CPC ....... *B60N 2/01508* (2013.01); *B60N 2/0224* (2013.01); *F16D 27/12* (2013.01); *B64D 11/0696* (2013.01)

(58) Field of Classification Search
CPC ... B60N 2/01508; B60N 2/0224; F16D 27/12; B64D 11/0696
USPC ...................................... 296/65.13
See application file for complete search history.

(56) References Cited

U.S. PATENT DOCUMENTS

| 2,805,701 | A | | 9/1957 | McCormick | |
|---|---|---|---|---|---|
| 3,652,050 | A | | 3/1972 | Marrujo et al. | |
| 3,780,668 | A | * | 12/1973 | Schwarzler | B61B 13/08 D12/40 |
| 3,797,403 | A | * | 3/1974 | Schwarzler | B61B 13/08 104/286 |
| 3,842,748 | A | * | 10/1974 | Schwarzler | B61B 13/08 335/297 |

(Continued)

FOREIGN PATENT DOCUMENTS

| CN | 205302713 U | * | 6/2016 |
|---|---|---|---|
| CN | 211494079 U | * | 9/2020 |

(Continued)

OTHER PUBLICATIONS

KR 570 machine translation (Year: 1997).*

(Continued)

*Primary Examiner* — Hilary L Gutman
(74) *Attorney, Agent, or Firm* — Ostrager Chong Flaherty & Broitman P.C.

(57) ABSTRACT

A seat assembly, a multi-passenger vehicle, and a method for attaching seats to a floor of a vehicle that employ an electromagnetic coupling between the seats and the floor. A power supply supplies electricity to the electromagnetic coupling to secure the seats to the floor and is turned off to release the seats from the floor without tools or workers bending down below the seats to remove coupling devices. The seats can therefore be readily repositioned or rearranged to adjust the spacing between the seats. Resident induction coupling is included between the floor of the vehicle and the seats to provide wireless power to the seats.

18 Claims, 11 Drawing Sheets

(56) References Cited

U.S. PATENT DOCUMENTS

| | | | |
|---|---|---|---|
| 3,845,720 A * | 11/1974 | Bohn | B60L 13/003 104/130.02 |
| 4,771,969 A | 9/1988 | Dowd | |
| 4,776,533 A | 10/1988 | Sheet et al. | |
| 4,796,837 A | 1/1989 | Dowd | |
| 4,825,773 A * | 5/1989 | Morishita | B60L 13/08 318/135 |
| 5,083,726 A | 1/1992 | Schurr | |
| 5,152,227 A * | 10/1992 | Kato | B61B 13/04 104/282 |
| 6,260,813 B1 | 7/2001 | Whitcomb | |
| 6,601,798 B2 | 8/2003 | Cawley | |
| 7,021,596 B2 | 4/2006 | Lory | |
| 7,029,215 B2 | 4/2006 | Dowty | |
| 7,334,758 B2 | 2/2008 | Williamson et al. | |
| 7,506,855 B2 | 3/2009 | Frantz et al. | |
| 7,975,979 B2 | 7/2011 | Bishop | |
| 8,074,954 B2 | 12/2011 | Wilhelm et al. | |
| 8,292,224 B1 | 10/2012 | Ahad et al. | |
| 8,371,781 B2 | 2/2013 | Roy et al. | |
| 8,528,860 B2 | 9/2013 | VanderWolk | |
| 8,602,702 B2 | 12/2013 | Roy et al. | |
| 8,608,125 B2 | 12/2013 | Grether et al. | |
| 9,567,086 B2 | 2/2017 | Siegmeth | |
| 10,046,847 B2 | 8/2018 | Cullen et al. | |
| 10,179,651 B2 | 1/2019 | Olulana et al. | |
| 10,259,585 B2 | 4/2019 | Sodore | |
| 2005/0061914 A1* | 3/2005 | Bishop | B60N 2/01575 244/118.5 |
| 2017/0309506 A1* | 10/2017 | Krishnan | H01L 24/97 |
| 2018/0265203 A1* | 9/2018 | Agrawal | B64C 1/20 |
| 2018/0290751 A1* | 10/2018 | Emrich | B60N 2/01525 |

FOREIGN PATENT DOCUMENTS

| | | | | |
|---|---|---|---|---|
| CN | 113135293 A | * | 7/2021 | B64D 11/0696 |
| DE | 102016100750 A1 | * | 7/2017 | E01D 19/04 |
| EP | 0922632 A2 | | 6/1999 | |
| EP | 0922632 A3 | | 8/2000 | |
| FR | 2792923 A1 | * | 11/2000 | B66B 5/20 |
| FR | 2998411 A1 | * | 5/2014 | H01F 38/14 |
| KR | 97036570 A | * | 7/1997 | |
| KR | 2003083143 A | * | 10/2003 | |
| KR | 20150068093 A | * | 6/2015 | |
| WO | WO-9916637 A1 | * | 4/1999 | B60N 2/01508 |
| WO | WO-2005108149 A1 | * | 11/2005 | B60N 2/0232 |
| WO | WO-2017109188 A1 | * | 6/2017 | B64D 11/0639 |

OTHER PUBLICATIONS

KR 570 abstract (Year: 1997).*
Jawara, "Aircraft Seat Track," The Best and Latest Aircraft 2018, published at krotoku.com/aircraft-seat-track, Feb. 6, 2015.
Bishop Gmbh Aeronautical Engineers, "The New 1/2 Inch Fitting Product Has Been Tested and Is Ready for the Market", published at https://www.bishop-gmbh.com/index.php?page=specialprograms, Hamburg, Germany, 2017.
Recaro CL3710, The New Dimension, Economy Class Seating, published at https://www.recaro-as.com/en/aircraft-seats/economy-class/cl3710.html at least as early as May 24, 2019.
Runway Girl Network, "Half-inch seat fitting promises seat pitch flexibility; what of #PaxEx?," published at https://runwaygirlnetwork.com/2016/10/25/half-inch-seat-fitting-promises-seat-pitch-flexibility-what-of-paxex/, Oct. 25, 2016.
Bishop GmbH Aeronautical Engineers, "FSAS Flexible Seat Arrangement System, Manual Light Reconfiguration", Hamburg, Germany, at least as early as May 24, 2019.

* cited by examiner

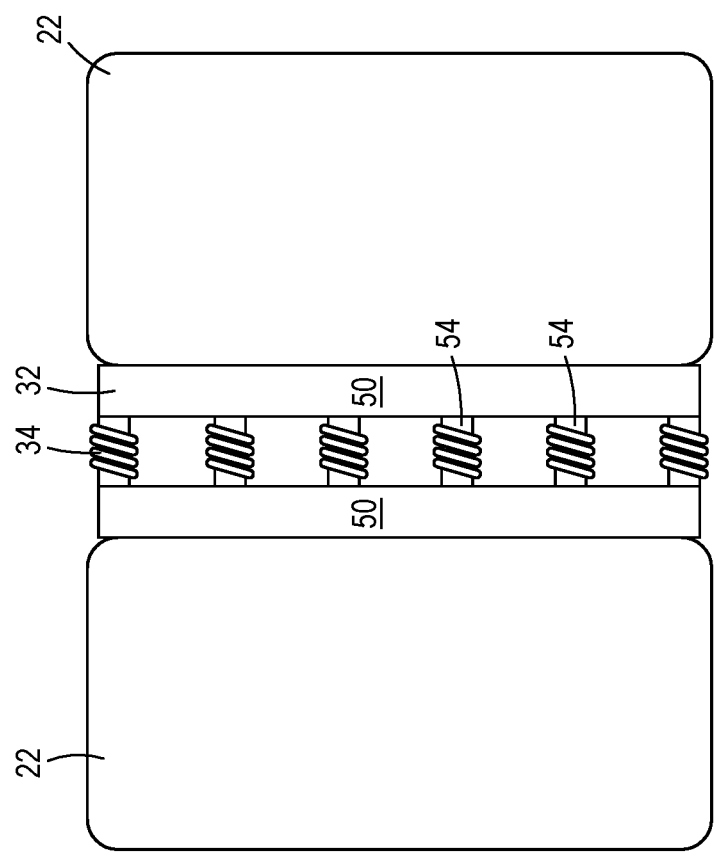
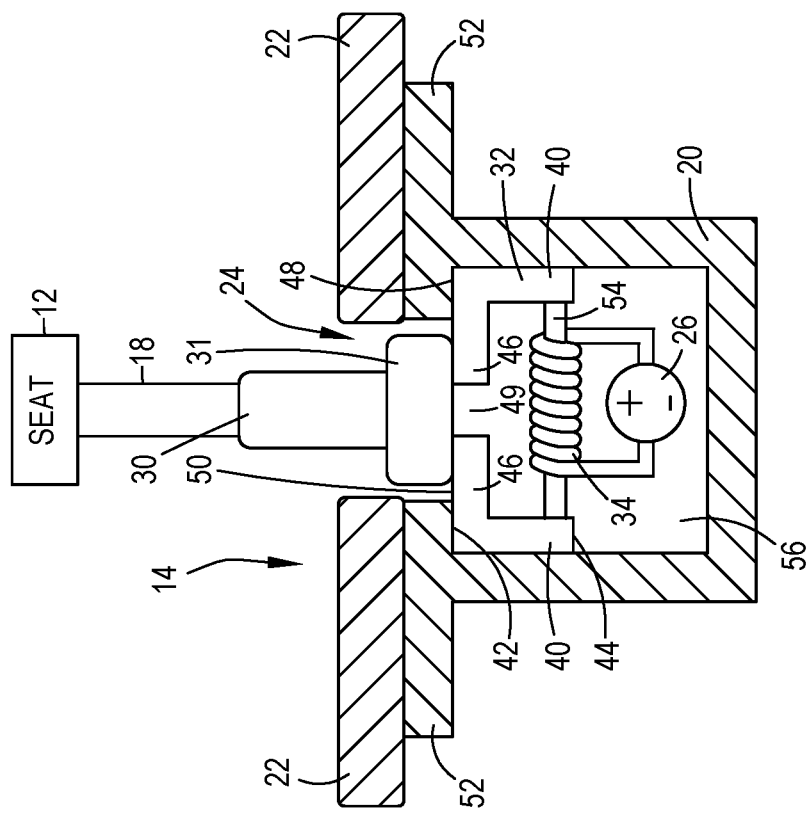

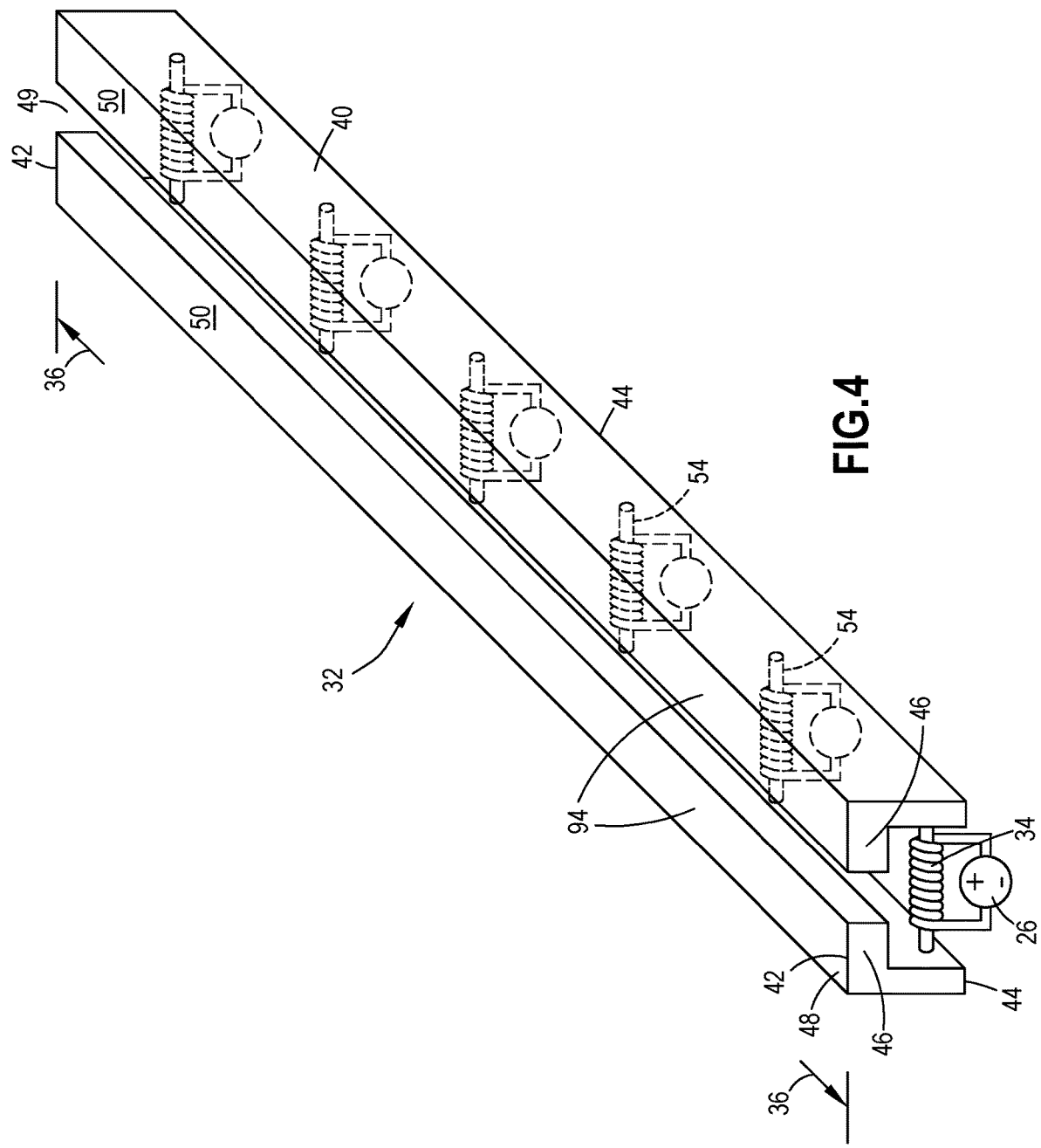

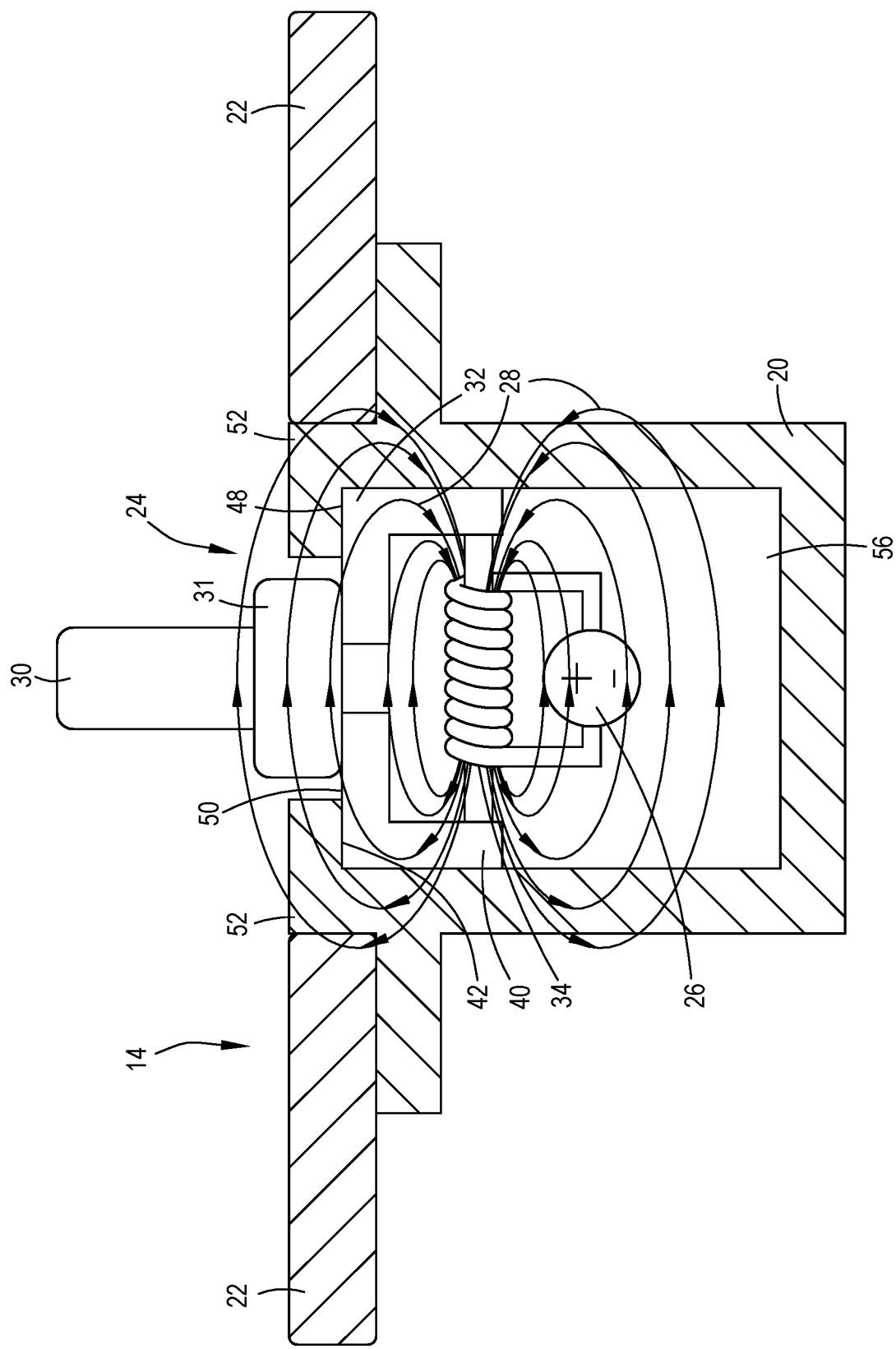

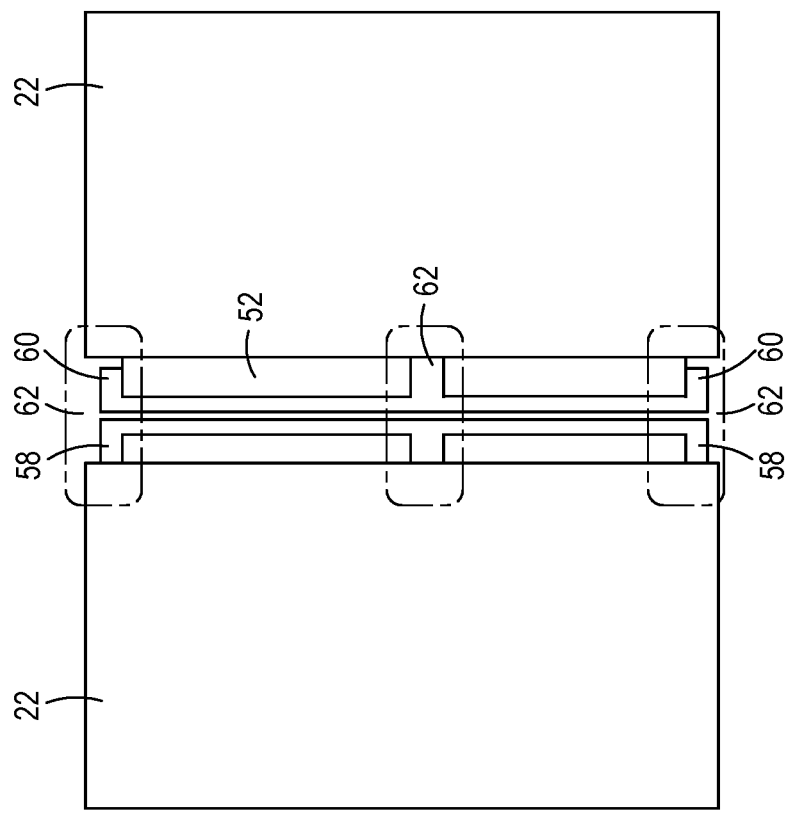
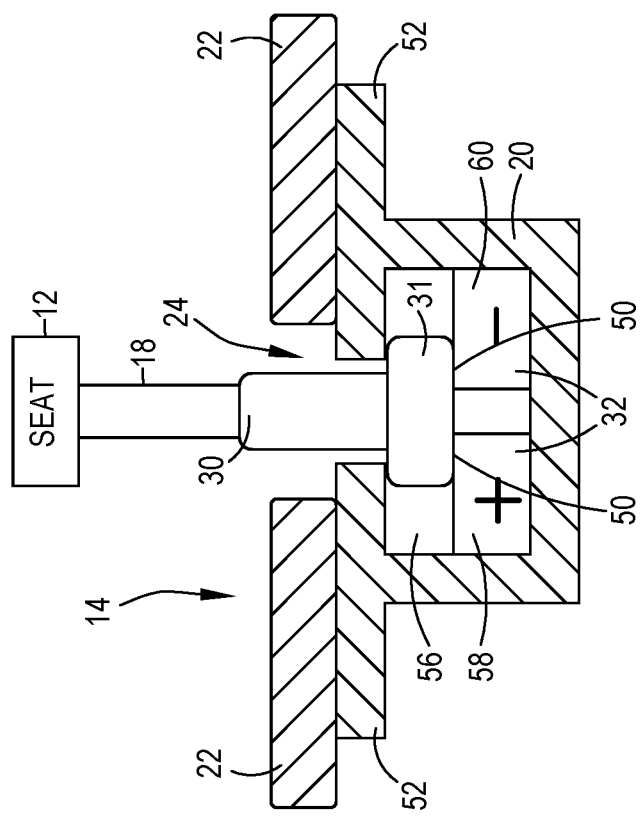

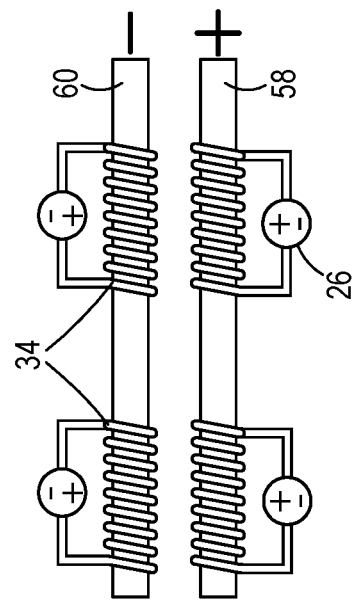
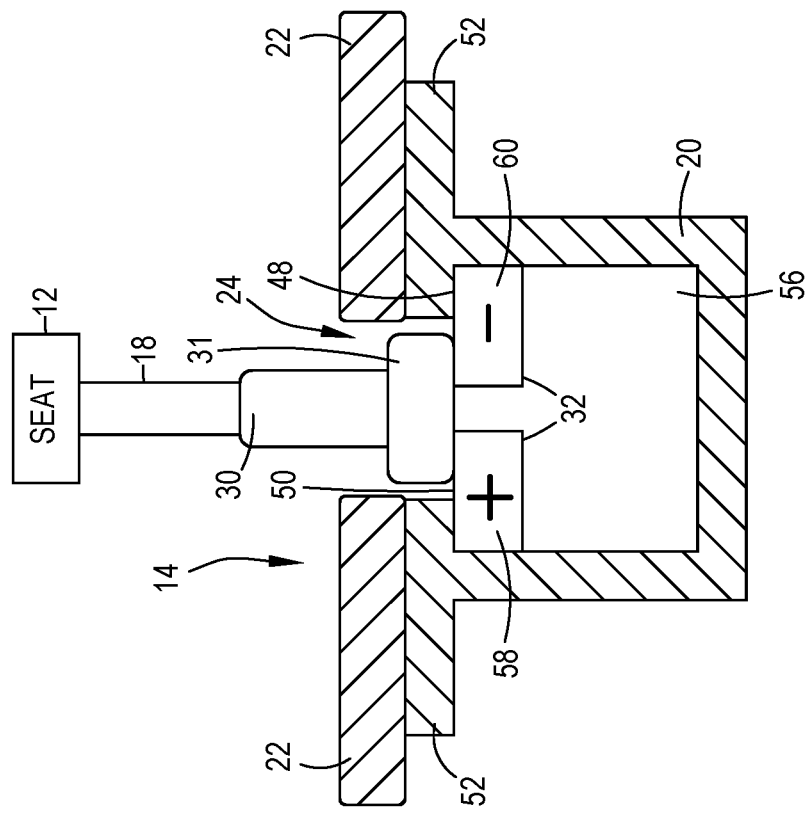
FIG.7B
FIG.7A

ELECTROMAGNETIC SEAT ATTACHMENT AND SEAT POWER

TECHNICAL FIELD

This disclosure relates generally to systems and methods for attaching seats to a floor or other support structure in a vehicle and, more specifically, to a seat assembly and seat attachment method that uses electromagnetics to removably attach seats to the floor or other support structure and to provide power to seats.

BACKGROUND

In modern vehicles, such as aircrafts, trains, subways, buses, and other multi-seat transportation vehicles, it is desirable for a vehicle owner or an operator of the vehicle to have the ability to change the arrangement of and spacing between seats and the arrangement of and spacing between seats and other vehicle components (e.g., partitions, galleys, and lavatories) to provide for increased or decreased seat density within a passenger cabin of the vehicle. This can be accomplished by removably attaching one or more seats and other vehicle components to one or more tracks that extend lengthwise through the vehicle and are secured to or within the floor or other support structure of the vehicle.

For example, a seat assembly in a vehicle can include one or more seat members coupled to a pair of support members that are attached to a pair of seat tracks in a floor assembly having floor panels disposed on opposing sides of the seat tracks. Attachment assemblies attach the support members to an engagement member of the seat tracks. For example, a slot or recess is disposed within the engagement member and extends a length of the seat track. The slot forms a plurality of alternating holes (defined by semi-circular cut-out portions) and lands that are adapted to cooperatively engage the attachment assemblies. The attachment assemblies have a stud that extends outwardly from a bottom thereof with a flared end. In operation, the flared end of the attachment assembly is engaged into one of the holes in the slot and is slidably moved within the slot to a desired location along the length of the slot, at which point the attachment assembly is secured to one of the lands with bolts, pins, wedges, or other types of mechanical fastening elements to create a snug fit between the flared end and the slot and prevent rattle and unintended displacement of the seat members.

Thus, the slot within the engagement member of the seat tracks permits the owner or operator of the vehicle to control the longitudinal spacing between the seat members by adjusting the location of the attachment assembly within the slot but only in specified increments defined by the size of and distance between the holes and lands. Repositioning the seat members using a system like this can also be difficult and time-consuming as a worker has to crouch down below the seat members to remove or loosen the mechanical fastening elements and then to re-attach or tighten the mechanical fastening elements after the seat members have been repositioned in the slot. In addition, if electrical power is to be supplied to the seat members, e.g., to provide power for entertainment systems mounted on the seats, repositioning the seat members may require electrical wiring to be disconnected and then re-connected after the seat members have been repositioned.

BRIEF DESCRIPTION

The subject matter disclosed in some detail below is directed to an electromagnetic seat assembly and method for attaching a seat to a floor or other support structure of a vehicle. The method and system are applicable to any type of vehicle where optimization of the arrangement of and spacing between seats and between seats and other vehicle components within the vehicle is desired including, but not limited to, aircrafts, automobiles, watercraft, buses, trains, subways, and other multi-seat transportation vehicles.

In one aspect of the disclosure, a seat assembly includes a seat, for example a passenger seat in a commercial aircraft or other vehicle, a floor assembly, including at least one floor panel, upon which the seat will be positioned, an electromagnetic coupling between the seat and the floor assembly, and a power supply for supplying electricity to the electromagnetic coupling. When the power supply is turned on, a magnetic field is generated to secure or lock the seat to the floor assembly. When the power supply is turned off, the magnetic field dissipates, and the seat is released from the floor assembly to permit the seat to be removed or repositioned anywhere along a length of the floor assembly within the vehicle. The seat assembly does not require any tools for attaching the seat to the floor assembly or releasing the seat from the floor assembly, or require a worker to bend down below the seat to install or remove any mechanical fastening elements in order to attach the seat to the floor assembly or release the seat from the floor assembly.

In one aspect of the disclosure, the electromagnetic coupling includes an attachment post comprising a ferromagnetic material mounted to or extending from a bottom of the seat, an electromagnetic rail positioned in the floor assembly and adapted to engage with the attachment post of the seat, and a first plurality of magnetic coils wound around the electromagnetic rail and spaced apart along a length of the electromagnetic rail. A power supply supplies electricity to the first plurality of magnetic coils to generate a magnetic field around the electromagnetic rail, which attracts the ferromagnet material in the attachment post to secure or lock the seat to the floor assembly.

In another aspect of the disclosure, the electromagnetic rail is arranged to have a pair of spaced apart and parallel sidewalls having a top side and a bottom side, a pair of lips projecting perpendicularly inwards toward each other from the top side of the sidewalls to form an open slot between the lips that extends a length of the electromagnetic rail. The top side of the sidewalls provides a support surface for the floor panel. The lips have an upper surface adapted for engaging with the attachment post of the seat. A plurality of crossbars is provided to connect the bottom side of one of the pair of sidewalls to the bottom side of another of the pair of sidewalls at regularly spaced intervals along the length of the electromagnetic rail. In this aspect of the disclosure, the magnetic coils are wound around the crossbars.

The electromagnetic rail may be integrated into the floor assembly directly or it may be integrated into a seat track that is integrated into the floor assembly. When the electromagnetic rail is integrated directly into the floor assembly, the electromagnetic rail is configured to have a mounting flange for mounting the electromagnetic rail to a bottom surface of the floor panel. The mounting flange projects perpendicularly outward from the top side of the sidewalls. The electromagnetic rail may also be configured with a reinforcement flange for reinforcing the electromagnetic rail against bending. The reinforcement flange projects perpendicularly outward from the bottom side of the sidewalls.

When the electromagnetic rail is integrated into a seat track in the floor assembly, it may be integrated into any known type of seat track or in other types of seat tracks. In one aspect, a seat track having an open channel is positioned within the floor assembly such that the open channel of the seat track is exposed through the floor panel. The electromagnetic rail is positioned within the open channel of the seat track. In operation, the attachment post of the seat is positioned in the open channel of the seat track and on top of the electromagnetic rail and becomes locked or secured to the electromagnetic rail when the power supply is turned on to supply electricity to the electromagnetic rail.

In another aspect of the disclosure, the electromagnetic rail is configured with two rails—a first rail and a second rail positioned parallel to and spaced apart from the first rail. The first rail and the second rail extend lengthwise through the floor assembly and have an upper surface adapted for engaging with the attachment post of the seat. The magnetic coils are separately wound around the first rail and the second rail at spaced intervals along the first rail and the second rail. The power supply supplies electricity to the magnetic coils wound around the first rail and the second rail to generate magnetic fields around the first rail and the second rail. This configuration of the electromagnetic rail may be integrated into a seat track or integrated directly into the floor assembly with no seat track. When integrated into a seat track having an open channel positioned within the floor assembly such that the open channel of the seat track is exposed through the floor panel, the first rail and the second rail are positioned at a lower portion of the open channel and the attachment post is positioned between the upper surface of the electromagnetic rail and a top of the seat track. Alternatively, the first rail and the second rail are positioned at a top of the open channel, and the attachment post is positioned on top of the first rail and the second rail.

In yet another aspect of the disclosure, the electromagnetic coupling includes an attachment post comprising an electromagnetic material mounted to or extending from a bottom of the seat and a rail that is made from a ferromagnetic material positioned in the floor assembly and adapted to engage with the attachment post of the seat. One or more magnetic coils is positioned around the attachment post and the power supply supplies electricity to the one or more magnetic coils to generate a magnetic field around the attachment post.

In a still further aspect of the disclosure, the seat assembly also includes a resonant inductive coupling power system for wirelessly supplying electrical power to the seat for such things as entertainment systems or other systems that require power. The resonant inductive coupling power system includes a transmit coil positioned in the floor assembly for generating an oscillating magnetic field, a transmit coil power supply for supplying electricity to the transmit coil to generate the oscillating magnetic field, and a receive coil positioned in the seat for receiving magnetic energy from the oscillating magnetic field and converting the magnetic energy into electrical power for the seat. This permits delivery of power to the seats with no wired connection, thus reducing the time for workers to remove electrical connections when removing or repositioning seats. Data connections to the seats can be achieved using WIFI or other industry accepted wireless transfer protocols.

In another aspect of the disclosure, a vehicle includes a plurality of the seats arranged in rows. Each row of seats may include seat assemblies including groupings of one or more seats. A floor assembly including at least one floor panel is provided to support the seat assemblies. An electromagnetic coupling is provided between one or more of the plurality of seat assemblies and the floor assembly. A power supply supplies electricity to the electromagnetic coupling such that when the power supply is turned on, the plurality of seats are secured to the floor assembly, and when the power supply is turned off, the one or more of the plurality of seats are released from the floor assembly to permit the one or more of the plurality of seats to be removed and/or repositioned to change an arrangement of or spacing between the rows of seats. The electromagnetic coupling includes an attachment post mounted to or extending from a bottom of one or more of the plurality of seats. The attachment post is made from a ferromagnetic material. An electromagnetic rail is positioned in the floor assembly and adapted to engage with the attachment post. A first plurality of magnetic coils is wound around the electromagnetic rail and spaced apart along a length of the electromagnetic rail. A power supply supplies electricity to the first plurality of magnetic coils to generate a magnetic field around the electromagnetic rail.

Vehicles include many sensors for measuring operational data of the vehicle, for example in an aircraft, sensors measure such things as altitude, speed, and other operational data. In another aspect of the disclosure, a controller is provided for controlling the power supply and receiving the operational data from the sensors. The controller is programmed to adjust the strength of the electromagnetic coupling between the seats and the floor assembly based on the operational data from the sensors. The controller may also be controlled manually by a user, for example the controller has a user interface for entering commands to the controller.

A method of attaching seats to a floor of a vehicle is also disclosed. The method includes positioning an electromagnetic rail in the floor of the vehicle, supplying electricity to the electromagnetic rail to generate a magnetic field, affixing an attachment post comprising a ferromagnetic material to a bottom of one or more of the seats, and positioning the attachment post proximate the electromagnetic rail such that the attachment post is magnetically attracted to the electromagnetic rail and the one or more of the seats are secured to the floor when the electricity is being supplied to the electromagnetic rail. The method also includes shutting off the electricity to the electromagnetic rail to release the one or more seats from the floor, receiving operational data of the vehicle from one or more sensors and adjusting an amount of electricity supplied to the electromagnetic rail to adjust a strength of the magnetic field based on the operational data from the one or more sensors, and supplying an oscillating current to a transmit coil located in the floor to generate an oscillating magnetic field, directing the oscillating magnetic field to a receive coil located in the one or more seats, and converting the oscillating magnetic field directed to the receive coil into electrical power for the one or more seats.

The features, functions, and advantages of the seat attachment and method that have been discussed, as well as other objects, features, functions, and advantages of the method and system disclosed herein can be achieved independently in various examples of the disclosure or may be combined in yet other examples further details of which can be seen with reference to the following description and drawings.

BRIEF DESCRIPTION OF THE DRAWINGS

Various implementations of the disclosed seat assembly and method for attaching seats to a floor or other support structure in a vehicle will be hereinafter described with reference to drawings for the purpose of illustrating the above-described and other aspects. None of the drawings briefly described in this section are drawn to scale.

FIG. 3A is a cross-sectional view of a seat assembly incorporated into a seat track.

FIG. 3B is a top view of a floor assembly for the seat assembly shown in FIG. 3A.

FIG. 4 is a perspective view of an electromagnetic rail that can be used in the seat assembly of FIGS. 3A and 3B.

FIG. 5 is a cross-sectional view of a seat assembly, with the seat removed, including the electromagnetic rail shown in FIG. 4 incorporated into another seat track and showing a magnetic field.

FIG. 6A is a cross-sectional view of a seat assembly in accordance with a second implementation of this disclosure.

FIG. 6B is a top view of a floor assembly for the seat assembly shown in FIG. 6A.

FIG. 7A is a cross-sectional view of a seat assembly in accordance with a third implementation of this disclosure.

FIG. 7B is a top view of a pair of electromagnetic rails in accordance with the second and third implementations of this disclosure.

Figure 1:
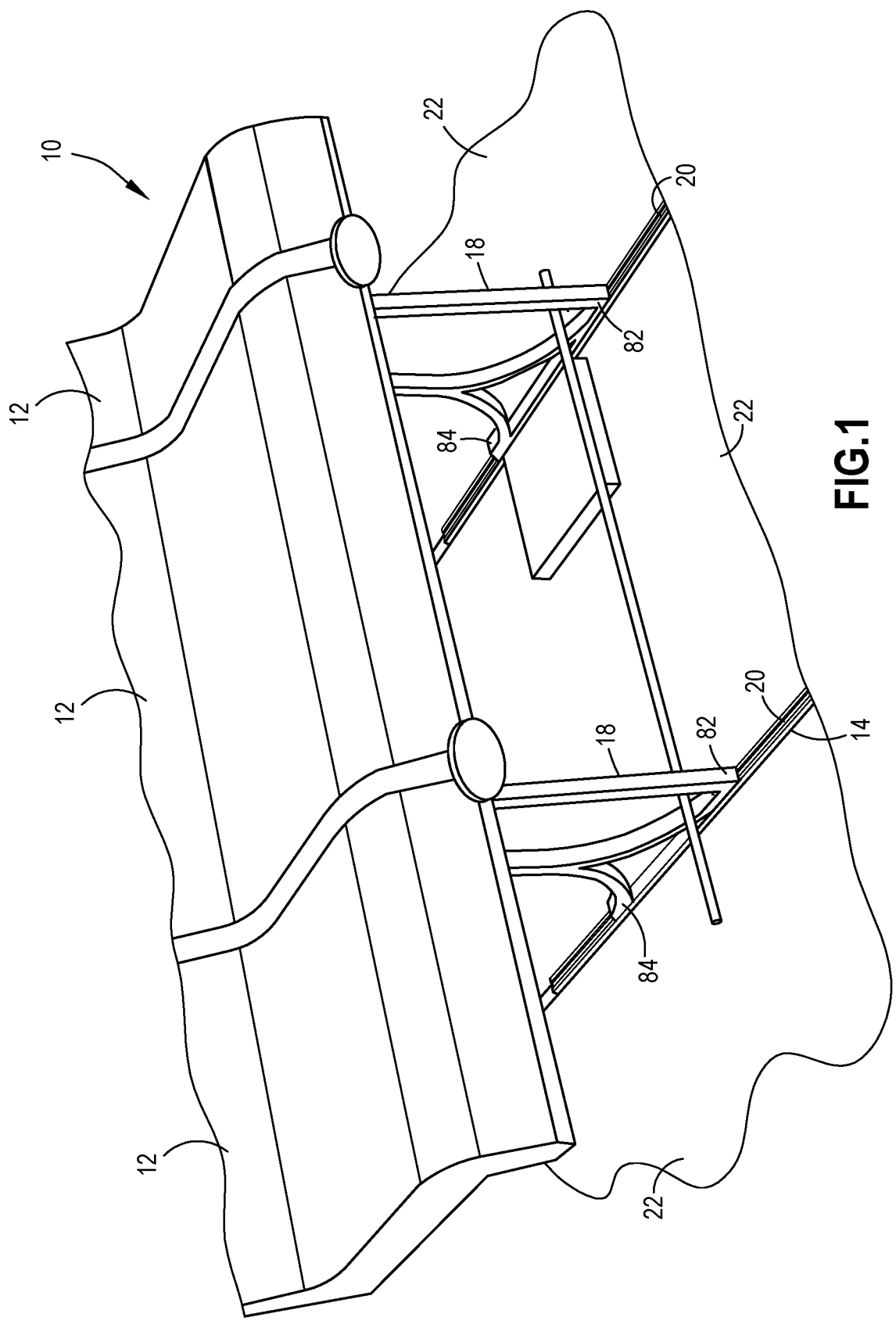
FIG. 1 is a perspective view of a seat assembly when assembled.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operators(s), unless the contrary intention is apparent.

DETAILED DESCRIPTION

Illustrative implementations of a seat assembly and methods for attaching seats to a floor assembly of a vehicle using electromagnetics are described in some detail below with reference to the drawings. However, a person skilled in the art will appreciate that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the following description and drawings, the disclosed seat assembly and methods for attaching seats to a floor assembly of a vehicle using electromagnetics are described and shown in the context of seats in a passenger cabin of a commercial airplane as a non-limiting example of an implementation of the disclosed seat assembly and methods. The disclosed seat assembly and methods can readily be adapted for use with any other type of vehicle where it is desired to have the ability to remove and/or reposition the seats and/or other vehicle components.

Figure 2:
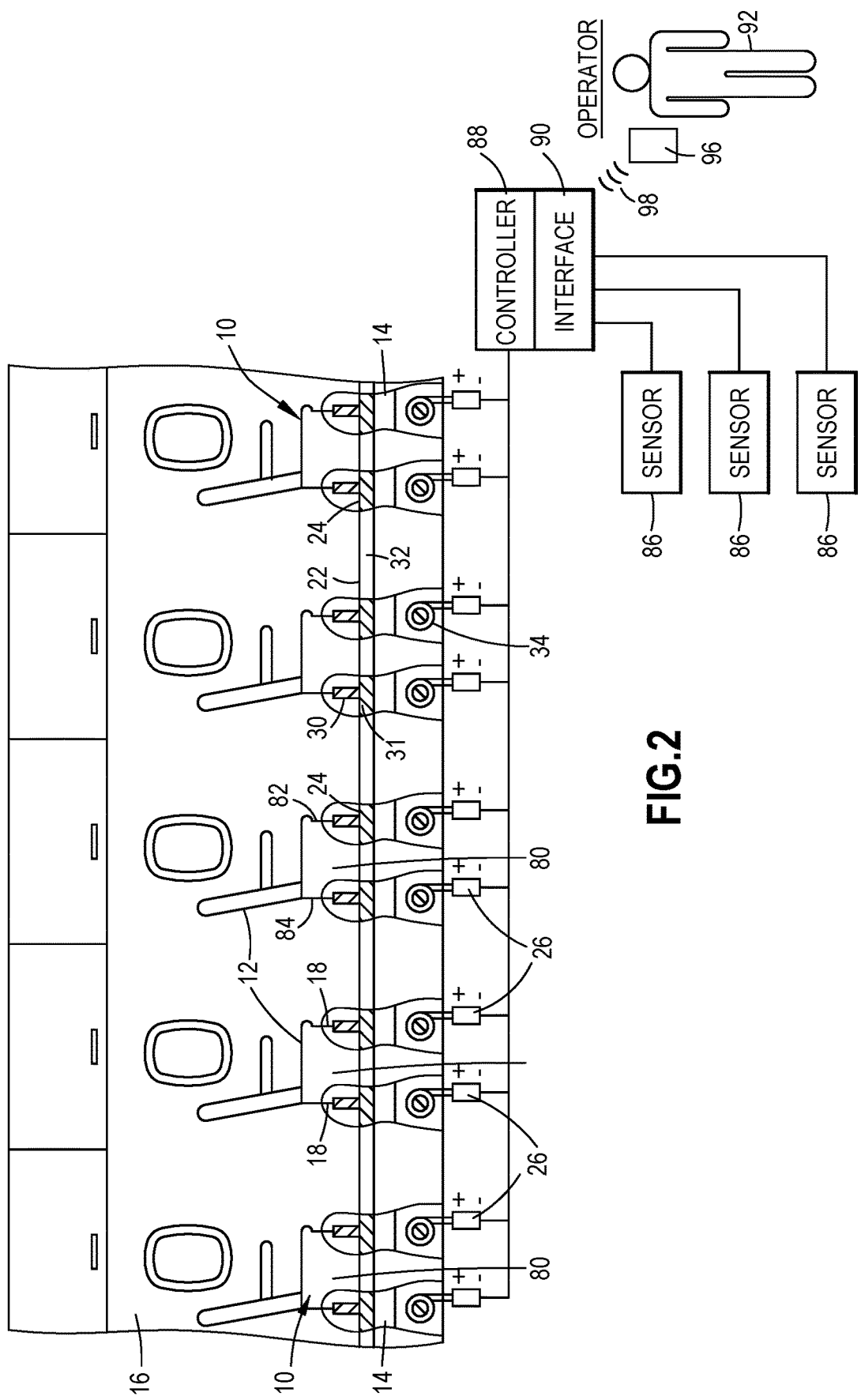
FIG. 2 is an illustration of a partial vehicle in cross-section having a plurality of seat assemblies arranged in rows.

FIG. 1 is an illustration of a seat assembly 10 that includes one or more seats 12, for example a passenger seat in a commercial aircraft or other vehicle, such as the vehicle 16 shown in FIG. 2, electromagnetically coupled to a floor assembly 14 through a pair of support members 18, each of the support members 18 having a forward leg 82 and an aft leg 84. The floor assembly 14 supports the seats 12 and may include a pair of seat tracks 20 and at least one floor panel 22 disposed on opposing sides of the seat tracks 20. Other configurations of seats 12 and seat tracks 20 may be used with more or fewer seats 12 and seat tracks 20.

FIG. 2 illustrates a portion of a vehicle 16 that includes a plurality of seats 12 arranged in rows 80. Each of the rows 80 includes a seat assembly 10 having groupings of one or more seats 12 (as shown for example in FIG. 1). A floor assembly 14 including at least one floor panel 22 is provided to support the seats 12 and an electromagnetic coupling 24 is provided between the support members 18 of the seats 12 and the floor assembly 14 as described in more detail below. In use, the electromagnetic coupling 24 is configured to attach the support members 18 to the floor assembly 14 and provide efficient and ergonomic installation and removal or repositioning of the seats 12 without tools. In most configurations, two support members 18 are used for a seat assembly 10 that has one to three seats 12 as shown in FIG. 1, and each of the support members 18 has a forward leg 82 and an aft leg 84 electromagnetically coupled to the floor assembly 14. The seat assembly 10 may be configured to have any number of support members 18 that provide support for the seats 12 for the desired application.

Referring still to FIG. 2, at least one power supply 26 is provided in the vehicle 16 for supplying electricity to the electromagnetic coupling 24. When the power supply 26 is turned on, a magnetic field 28 (shown in FIG. 5) is generated in the electromagnetic coupling 24 to secure the support members 18, and therefore the seats 12, to the floor assembly 14. When the power supply 26 is turned off, the magnetic field 28 dissipates and the seats 12 are released from the floor assembly 14 to permit the seats 12 to be removed or repositioned anywhere along a length of the floor assembly 14 within the vehicle 16. For example, in an aircraft, the power supply 26 could be turned on and off from the flight deck or autonomously.

The power supply 26 may be a central supply powered by power facilities in the vehicle 16, or each seat assembly 10 may have its own power supply 26 (such as in the example shown in FIG. 2). When the vehicle 16 is not in use (e.g., when it is parked or undergoing maintenance) and the power facilities in the vehicle 16 are turned off, the electromagnetic coupling 24 provides friction between an attachment post 30 and an electromagnetic rail 32 to prevent the seats 12 from moving. A small battery that provides a small current to the electromagnetic rail 32, or a battery used for operation of the vehicle 16, could be utilized to provide a relatively small holding force for longer periods. If the vehicle 16 is in storage or in maintenance for an extended period, a mechanical fastening element could be used to lock one or more of the forward leg 82 and the aft leg 84 of the support members 18 to the floor assembly 14. In addition, an extra single large battery could be provided in the vehicle 16 to support instances where there is a loss of primary power to the seat assemblies 10. For triple redundancy, there could be a further extra small battery to maintain the seats 12 attached to the floor assembly 14 for a relatively short duration of time. Any type of battery suitable for a specific application and vehicle may be used. For example, Lithium-Ion batteries are useful because of their specific energy capacity to weight ratio.

The seat assembly 10 does not require any tools for attaching or releasing the seats 12 from the floor assembly 14 or require a worker to bend down below the seats 12 to attach or remove any mechanical fastening elements in order to attach or release the seats 12 from the floor assembly 14. The electromagnetic coupling 24 in the seat assembly 10 shifts the paradigm from current seat attachment mechanisms that require mechanical fastening elements and tools to an automated electromagnetic system that allows interiors of a vehicle 16 to be changed in a matter of minutes without tools, even when the seats 12 require power routing. The seat assembly 10 allows seats 12 to all be locked to the floor assembly 14 and released from the floor assembly 14 at one time, and to be moved in and out of, for example, an aircraft, or for workers to change the seat pitch of the seats 12 (for example, from more business class seats to smaller seat pitches to fit more passengers) with extreme efficiency, in a matter of minutes, as compared to current operations.

Referring again to FIG. 2, the vehicle 16 includes sensors 86 for measuring operational data of the vehicle 16, such as airspeed, altitude, and acceleration in an aircraft. A controller 88 is provided for controlling each of the power supplies 26 and includes a user interface 90 for receiving the operational data from the sensors 86 and/or commands directly from an operator 92 (either by wired input device operatively connected to the user interface 90 or wireless signals 98). The controller 88 is programmed to adjust the strength of the electromagnetic coupling 24 between each of the respective seats 12 and the floor assembly 14 by determining the amount of power required to operate the electromagnetic coupling 24 to ensure the seats 12 remain attached to the floor assembly 14 under differing load requirements based on the operational data from the sensors 86. For example, in one example, the power supply 26 may be embodied as a variable power such that a lower or minimum voltage could be provided to the electromagnetic coupling 24 in nominal flight conditions and a higher or maximum voltage could be provided to the electromagnetic coupling 24 when the controller 88 determines based on the operational data that more power is needed to ensure the attachment of the seats 12 to the floor assembly 14. Alternatively, or in addition, an operator 92 of the vehicle 16 can also have the ability to turn on and off the power supply 26 and thereby secure the attachment of the seats 12 to the floor assembly 14 or remove the attachment, for example if there is to be a repositioning of the seats 12. The operator 92 can use the user interface 90 of the controller 88 or an app or secure wireless device 96 that can send signals by, for example, Wi-Fi, specific radio-frequency identification (RFID), or a Bluetooth command to the controller 88 to turn the electromagnetic coupling 24 for each seat assembly 10 in the vehicle on and off at the same time, or individually, if desired.

FIGS. 3A and 3B illustrate a first implementation of a floor assembly 14 that includes an electromagnetic coupling 24 between support members 18 of the seats 12 and the floor assembly 14. The electromagnetic coupling 24 includes an attachment post 30 comprising a ferromagnetic material mounted to a bottom of the support members 18 of the seats 12, or alternatively, the support members 18 are constructed as a unitary part having an attachment post 30 extending from a bottom surface of the support members 18. The ferromagnetic material of the attachment post 30 may be any lightweight material that exhibits ferromagnetic properties, such as Permalloy (Ni—Fe).

An electromagnetic rail 32 is positioned in the floor assembly 14 and adapted to engage with the attachment post 30 such that the electromagnetic rail 32 acts an attachment point for the seats 12 to attach to the floor assembly 14. The electromagnetic rail 32 is made from any lightweight material that is suitable for carrying an electromagnetic charge, such as a ferromagnetic material, preferably laminated steel or Permalloy (Ni—Fe). The attachment post 30 has a flared end 31 with a larger surface area to engage the electromagnetic rail 32. When assembled, the attachment post 30, or the flared end 31 of the attachment post 30, is positioned on a top engagement surface 50 of the electromagnetic rail 32. Thus, the seat assembly 10 also allows seats 12 to be moved along the length of the floor assembly 14 in any increments, not limited to specific increments, such as ½ inch or 1-inch increments, of currently available seat tracks.

In this and other implementations, the electromagnetic rail 32 is integrated within an open channel 56 in the seat tracks 20 in the floor assembly 14 and has a width that provides a snug fit between the electromagnetic rail 32 and an interior surface of the open channel 56 to provide support for the seats 12 and to ensure that all seats 12 along the seat tracks 20 are aligned parallel to each other. Any means for securing the electromagnetic rail 32 within the open channel 56 may be used. The electromagnetic rail 32 may be integrated into any known type of seat tracks 20 or into any new types of seat tracks 20. For example, as shown in FIGS. 3A and 3B, seat tracks 20 are positioned within the floor assembly 14 such that the open channel 56 is exposed through the floor panel 22. The electromagnetic rail 32 is positioned within the open channel 56 of the seat tracks 20. The attachment post 30 or flared end 31 of the attachment post 30 is positioned in the open channel 56 of the seat tracks 20 and on top of the electromagnetic rail 32.

FIG. 4 is a perspective view of the electromagnetic rail 32 shown in FIGS. 3A and 3B. As shown in FIG. 4, the electromagnetic rail 32 has a length 36 that extends longitudinally along a portion of the vehicle 16 in which the seats 12 are located, for example, a passenger cabin of an aircraft. If seat tracks 20 are employed in the floor assembly 14, the length 36 of the electromagnetic rail 32 is less than or equal to the length of seat tracks 20.

In the implementation shown in FIGS. 3A, 3B, and 4, the electromagnetic rail 32 is arranged to have a pair of L-shaped members 94 that are spaced apart and parallel to each other. Each of the L-shaped members 94 is defined by a sidewall 40 having a top side 42, a bottom side 44, and a lip 46 that projects perpendicularly inwards from an inner surface at the top side 42 of the sidewall 40. The lip 46 on one of the L-shaped members 94 extends toward the lip 46 on another of the pair of L-shaped members 94 to form an open slot 49 between inner edges of the lips 46. The open slot 49 extends the length 36 of the electromagnetic rail 32. The top side 42 of the L-shaped members 94 provides a support surface 48 for the floor panel 22 or the top member 52 of the seat tracks 20. The lips 46 have a top engagement surface 50 adapted for engaging with the attachment post 30 of the support members 18 of the seats 12.

A plurality of crossbars 54 connect the bottom side 44 of the sidewall 40 of one of the pair of L-shaped members 94 to the bottom side 44 of the sidewall 40 of another of the pair of L-shaped members 94 at regularly spaced intervals along the length 36 of the electromagnetic rail 32. The crossbars 54 may take the form of round or square bars mounted to the interior surfaces of the sidewalls 40 at or near the bottom side 44 of the sidewalls 40 as shown in FIGS. 3A and 4. The crossbars 54 may be mounted to the sidewalls 40 by any means for securing these types of parts together. Alternatively, the electromagnetic rail 32 is formed with integral crossbars 54 as shown in another implementation of the seat assembly in FIGS. 8-10 (described below). The support members 18 and the attachment post 30 extending therefrom preferably have a width no larger than a width of the crossbars 54 so that the support members 18 do not interfere with the feet of a person sitting in the seats 12.

The electromagnetic coupling 24 further includes a first plurality of magnetic coils 34 wound around a portion of the electromagnetic rail 32 and spaced apart along a length 36 of the electromagnetic rail 32 to optimize magnetic coupling between the electromagnetic rail 32 and the attachment post 30 (i.e., preferably to maximize the strength of the magnetic field 28 in the electromagnetic rail 32 and to magnetize the electromagnetic rail 32 uniformly along the length 36 of the electromagnetic rail 32). In the implementation shown in FIGS. 3A and 4, a magnetic coil 34 is wound around one or more of the crossbars 54. Preferably, a magnetic coil 34 is wound around each respective crossbar 54.

The magnetic coils 34 can be any conductive material, for example, copper or aluminum. The power supply 26 supplies electricity to the first plurality of magnetic coils 34 to generate a magnetic field 28 around and through the electromagnetic rail 32 (as shown in FIG. 5), which attracts the ferromagnet material in the attachment post 30 to secure the support members 18 of the seats 12 to the floor assembly 14.

FIGS. 3A and 3B show an implementation of a seat assembly 10 where the floor panel 22 is positioned on top of the top member 52 of the seat tracks 20 on both sides of the open channel 56 in the seat tracks 20 such that an interior vertical end surface of the floor panel 22 is aligned with an interior vertical end surface of the top member 52. Thus, in the top view shown in FIG. 3B, the seat tracks 20 are not shown because they are below the floor panel 22. The attachment post 30 is positioned within the open channel 56 in the seat tracks 20 and between the interior vertical end surface of the floor panel 22 on both sides of the open channel 56.

FIG. 5 shows an alternative implementation of a seat assembly 10 having the electromagnetic coupling 24 within the seat tracks 20, but the seat tracks 20 have a different configuration. In FIG. 5, the top member 52 of the seat tracks 20 is raised higher such that a top surface of the top member 52 is flush with a top surface of the floor panel 22 and the attachment post 30 is positioned between interior end surfaces of the top member 52. In both of these implementations, the electromagnetic rail 32 is held underneath the top member 52 of the seat tracks 20, which reacts bending loads. FIG. 5 shows an exemplary magnetic field 28 generated by the interaction of the power supply 26 through the magnetic coils 34 and the ferromagnetic material in the electromagnetic rail 32.

FIGS. 6A, 6B, 7A, and 7B show another implementation of the electromagnetic rail 32. In this configuration, the electromagnetic rail 32 is configured with two separate rails—a first rail 58 and a second rail 60. The second rail 60 is positioned parallel to and spaced apart from the first rail 58, but the first rail 58 and second rail 60 are not connected by crossbars 54 as in previously described implementations. The first rail 58 and the second rail 60 extend lengthwise through the floor assembly 14 and have a top engagement surface 50 adapted for engaging with the attachment post 30, or flared end 31 of the attachment post 30, of the seats 12.

As best shown in FIG. 7B, a plurality of magnetic coils 34 are wound separately around the first rail 58 and the second rail 60 at spaced apart intervals along the length 36 of the first rail 58 and the second rail 60 to provide maximum strength for the electromagnetic coupling 24 and to magnetize the electromagnetic rail 32 uniformly along the length 36 of the electromagnetic rail 32. The power supply 26 supplies electricity to the magnetic coils 34 wound around the first rail 58 and the second rail 60 to generate a magnetic field 28 and charge the first rail 58 positive and the second rail 60 negative, or vice-versa.

This configuration of the electromagnetic rail 32 may be integrated into seat tracks 20 or integrated directly into the floor assembly 14, i.e., no seat tracks 20. When integrated into seat tracks 20 having an open channel 56 positioned within the floor assembly 14 such that the open channel 56 is exposed through the floor panel 22, the first rail 58 and the second rail 60 are positioned at a lower portion of the open channel 56 as shown in FIG. 6A. The flared end 31 of the attachment post 30 is positioned between the top engagement surface 50 of the electromagnetic rail 32 and a top member 52 of the seat tracks 20, thus utilizing the top member 52 of the seat tracks 20 to provide additional locking in the z-direction of the attachment post 30. In this configuration, seats 12 could be removed from the floor assembly 14 by sliding the seats 12 forward or aft within the seat tracks 20 and lifted out of the seat tracks 20 at openings 62 where the top member 52 of the seat tracks is removed, as shown in FIG. 6B. Seats 12 can be installed by inserting the attachment post 30 through one of the openings 62 and sliding the seats 12 to the desired location along the length 36 of the electromagnetic rail 32.

Alternatively, referring to FIG. 7A, the first rail 58 and the second rail 60 are positioned at a top of the open channel 56 of the seat tracks 20 and the attachment post 30 is positioned on a top engagement surface 50 of the first rail 58 and the second rail 60. The seat tracks 20 and floor panel 22 in this implementation are the same as described above in connection with FIG. 4A.

Figure 8:
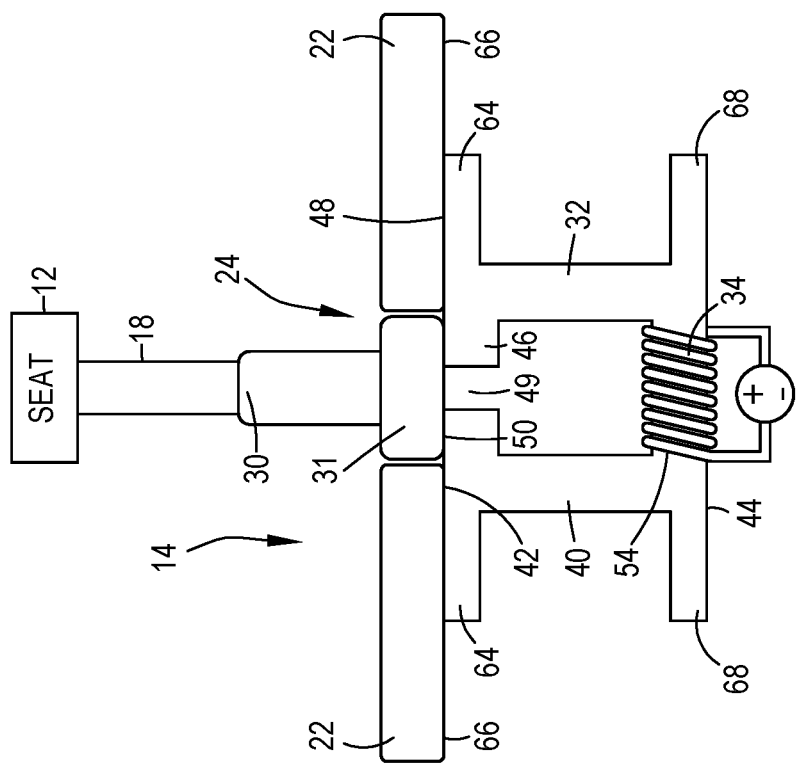
FIG. 8 is a cross-sectional view of a seat assembly in accordance with a fourth implementation of this disclosure that does not use a seat track.
Figure 9:
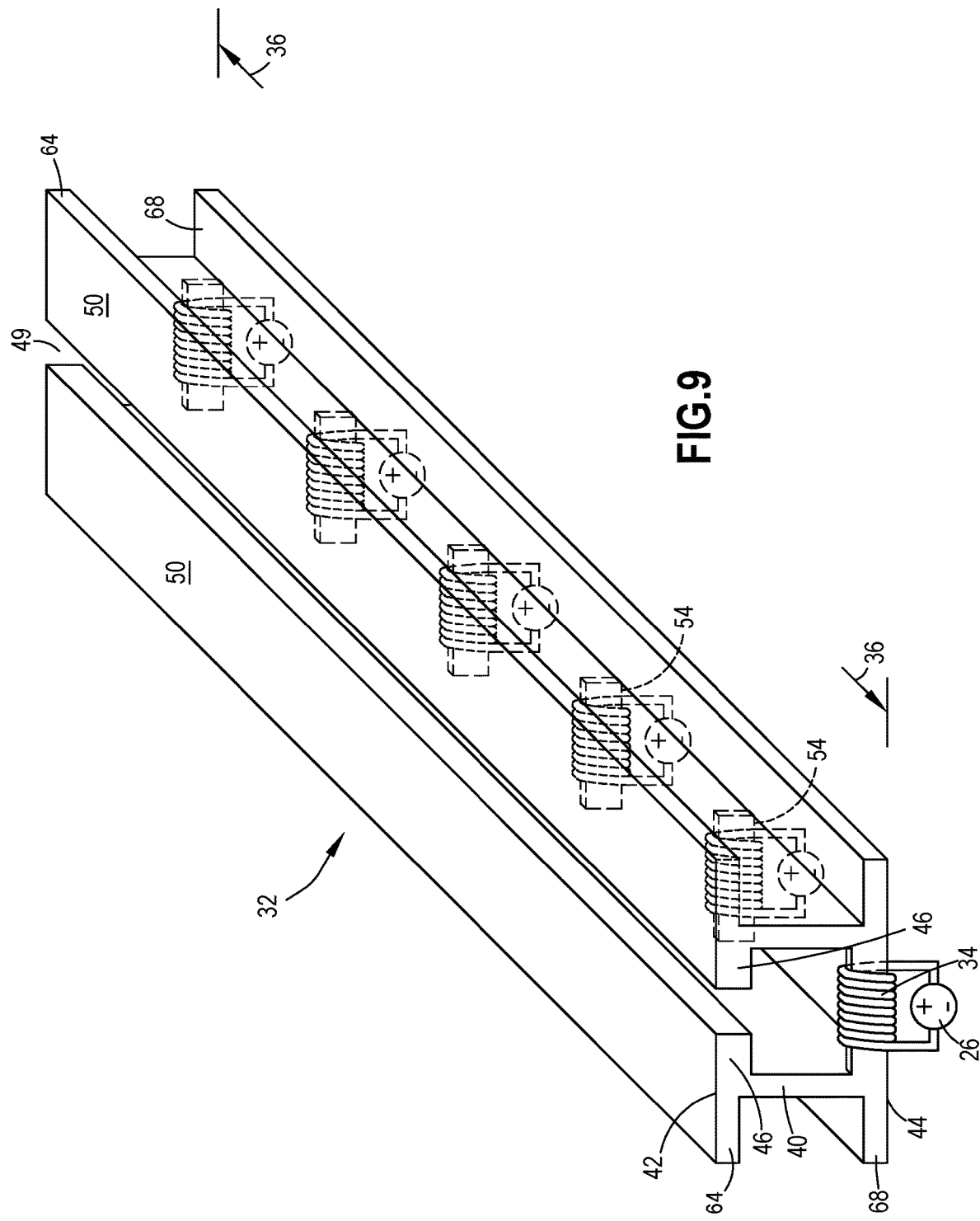
FIG. 9 is a perspective view of an electromagnetic rail that can be used in the seat assembly of FIG. 8.

FIGS. 8 and 9 show another implementation of an electromagnetic rail 32 that may be integrated directly into the floor assembly 14, i.e., no seat tracks 20, thus reducing the weight of the floor assembly 14, which is advantageous in many applications. The electromagnetic rail 32 is configured like the electromagnetic rail 32 shown in FIGS. 3A and 4 with sidewalls 40 and crossbars 54, but the electromagnetic rail 32 shown in FIGS. 8 and 9 has a unitary construction, additional structure for mounting in the floor assembly 14, and additional structural support. A mounting flange 64 projects perpendicularly outward from the top side 42 of the sidewalls 40 for mounting the electromagnetic rail 32 to a bottom surface 66 of the floor panel 22. A reinforcement flange 68 projects perpendicularly outward from the bottom side 44 of the sidewalls 40, the most weight efficient location, to resist bending loads.

In an alternative configuration, the electromagnetic coupling 24 includes an attachment post 30 comprising an electromagnetic material mounted to or extending from a bottom of the seats 12 and the electromagnetic rail 32 is made from a ferromagnetic material and positioned in the floor assembly 14 and adapted to engage with the attachment post 30 of the seats 12. One or more magnetic coils 34 is positioned around the attachment post 30 of the seats 12. The power supply 26 supplies electricity to the one or more magnetic coils 34 to generate a magnetic field 28 around the attachment post 30 or the magnetic coils 34 are powered through the power provided to the seats 12, with a battery backup in the case of a loss of primary power.

Figure 10:
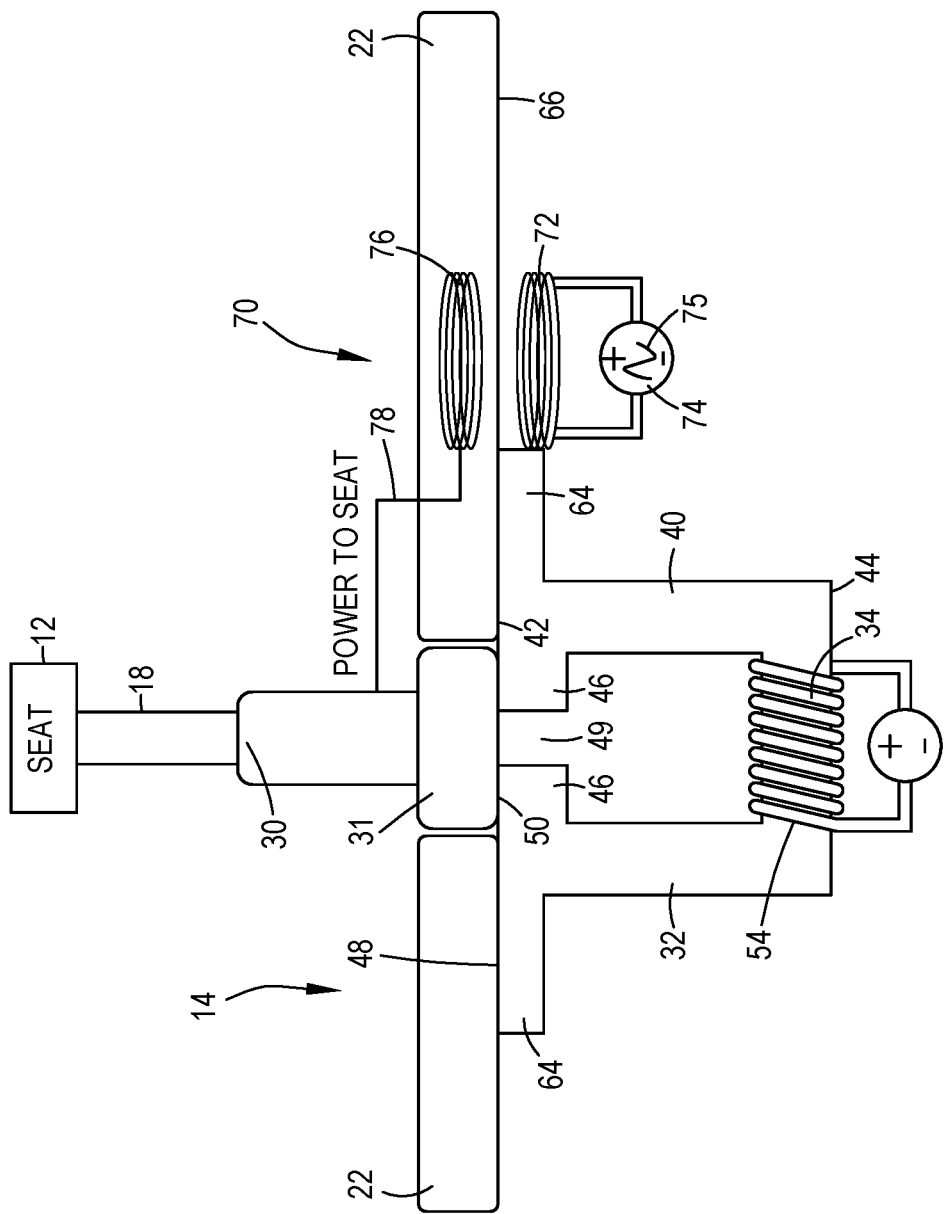
FIG. 10 is a cross-sectional view of a seat assembly, with the seat removed, in accordance with this disclosure having a resident inductive coupling power supply for the seat.

FIG. 10 illustrates a seat assembly 10 that includes a resonant inductive coupling power system 70 for wirelessly supplying electrical power to the seats 12 through the attachment post 30 for such things as entertainment and communication systems or other electrical or electronic systems in seats that require power. Providing wireless power to the seats 12 addresses the manufacturing of wire bundles routed into the seats 12 as well as makes moving seats 12 with power routing more efficient by removing the need to disconnect or connect wires when removing or repositioning the seats 12.

Resonant inductive coupling is the near-field wireless transmission of electrical energy between two coils that are tuned to resonate at a common frequency. The resonant inductive coupling power system 70 includes a transmit coil 72 positioned in the floor assembly 14 (underneath the floor panel 22 adjacent the electromagnetic rail 32) for generating an oscillating magnetic field. A transmit coil power supply 74 supplies an oscillating current 75 to the transmit coil 72 to generate the oscillating magnetic field. A receive coil 76 is positioned in proximity to the transmit coil 72 to pick up energy from the oscillating magnetic field. Since the transmit coil 72 and the receive coil 76 are resonant at a common frequency, significant power can be transmitted at reasonable efficiency from the transmit coil 72 to the receive coil 76 over a range of about one quarter wavelength, where wavelength is the speed of light divided by the frequency of the oscillating current 75. The transmit coil 72 and the receive coil 76 are preferably oriented so that the magnetic dipole field passing through the receive coil 76 from the transmit coil 72 is oriented within about 45 degrees of parallel to the receive coil 76. In some implementations, the receive coil 76 may be positioned in the floor panel 22 or above the floor panel 22 adjacent the attachment post 30, and an electrical connector 78 is connected between the receive coil 76 and seats 12 through the attachment post 30. Alternatively, the receive coil 76 can be positioned in the seats 12 or on the attachment post 30 for receiving magnetic energy from the oscillating magnetic field and converting the magnetic energy into electrical power for the seats 12. This permits delivery of power to the seats 12 without a wired connection, thus reducing the time for workers to remove electrical connections when removing or repositioning seats 12. Data connections to the seats 12 can be achieved using Wi-Fi or other industry accepted wireless transfer protocols.

Figure 11:
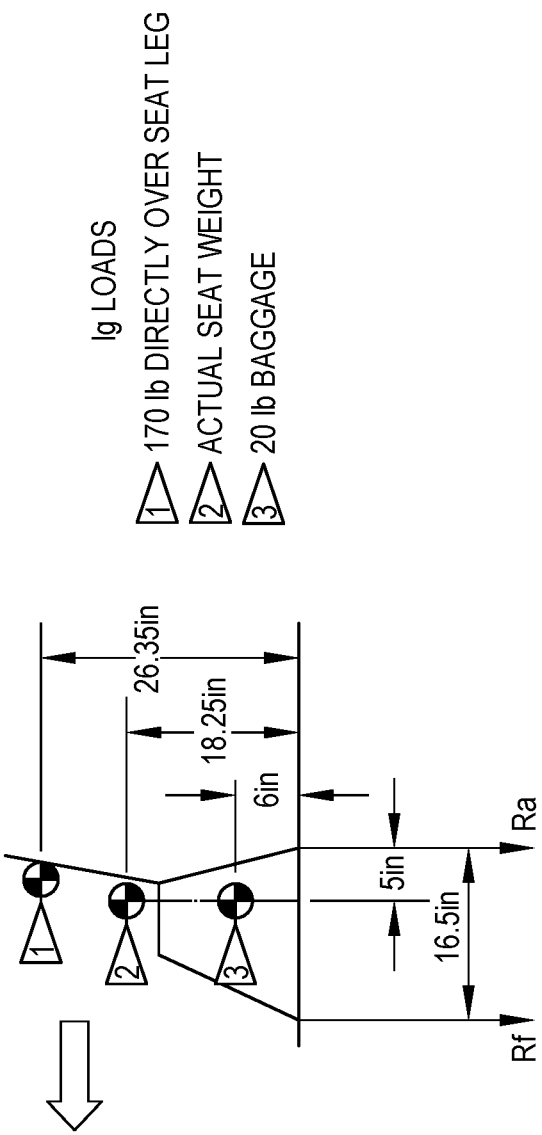
FIG. 11 is a seat loading configuration diagram for the seat assembly disclosed herein.

FIG. 11 is provided as an example of a method of calculating the field strength for the electromagnetic coupling device 24. Assume that a "pull-up" force of 4,000 lb/sq. ft is exerted by the seat. In this example, to counteract the pull-up force of 4,000 lb/sq. ft, each electromagnetic coupling 24 can be configured to provide 4,000 lb/sq. ft pulling force with a conservative power consumption of 15 W. The magnetic coils 34 can be designed (i.e., number of turns, diameter of wire, length of coil, current flow) to provide adequate magnetic field strength to achieve this pulling force. Assuming 15 W per passenger, at 12 volts DC (direct current), a single magnetic coil could support six passengers (two rows 80 of seats 12) with a current draw of 7.5 Amps. Operating voltage could range from a low voltage system (about 3.4 volts) to a high voltage (40+ volts) system, which could support magnetic coils 34 ranging from one coil for every one of the rows 80 of seats 12 to one coil for every 3-5 rows of seats 12. The foregoing load estimates would size the maximum operating voltage and current, as well as how often the magnetic coils 34 would need to be placed along the electromagnetic rail 32.

In an aircraft that accommodates 190 passengers, for example, and the energy density of the Lithium-Ion batteries is 100 W-h/kg, less than 1 pound of backup batteries would be needed. In a normal operating environment for an aircraft, roughly 3,000 lbf is used to hold the rows 80 of seat 12 down by applying roughly 9 W of power to each of the rows 80. In aircraft with 190 passengers and 4-hour flight time battery backup, 2,300 W-h of batteries would be needed, which is less than 50 pounds.

A method of attaching seats 12 to a floor assembly 14 of a vehicle 16 is also disclosed. The method includes positioning an electromagnetic rail 32 in the floor assembly 14 of the vehicle 16, supplying electricity to the electromagnetic rail 32 to generate a magnetic field 28, affixing an attachment post 30 comprising a ferromagnetic material to a bottom of one or more of the seats 12, and positioning the attachment post 30 on top of the electromagnetic rail 32 such that the attachment post 30 is magnetically attracted to the electromagnetic rail 32 and the one or more of the seats 12 are secured to the floor assembly 14 when electricity is being supplied to the electromagnetic rail 32. The method also includes shutting off the electricity to the electromagnetic rail 32 to release the one or more seats 12 from the floor assembly 14, receiving operational data of the vehicle 16 from one or more sensors 86 and adjusting an amount of electricity supplied to the electromagnetic rail 32 to adjust a strength of the magnetic field 28 based on the operational data from the one or more sensors 86, and supplying an oscillating current 75 to a transmit coil 72 located in the floor assembly 14 to generate an oscillating magnetic field, directing the oscillating magnetic field to a receive coil 76 located in or proximate to the one or more seats 12, and converting the oscillating magnetic field directed to the receive coil 76 into electrical power for the one or more seats 12.

Many modifications of the system and method disclosed herein may occur to those skilled in the art upon reading the specification. The present application includes such modifications and is limited only by the scope of the claims. The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A seat assembly, comprising:
a seat having an attachment post extending from a bottom of the seat, the attachment post comprising a ferromagnetic material;
a floor assembly including at least one floor panel and an electromagnetic rail positioned in the floor assembly adapted to engage with the attachment post of the seat, the electromagnetic rail comprising a pair of sidewalls having a top side and a bottom side, the pair of sidewalls arranged to be spaced apart and parallel; a pair of lips projecting perpendicularly inwards from the top side of the pair of sidewalls, the pair of lips having a top engagement surface that engages with the attachment post of the seat; and a plurality of crossbars connecting the bottom side of one of the pair of sidewalls to the bottom side of another of the sidewalls at regularly spaced intervals along the length of the electromagnetic rail;
an electromagnetic coupling between the seat and the floor assembly comprising a plurality of magnetic coils wound around the crossbars of the electromagnetic rail and spaced apart along a length of the electromagnetic rail; and
a power supply that supplies electricity to the plurality of magnetic coils to generate a magnetic field around the electromagnetic rail when the power supply is turned on to secure the seat to the floor assembly, and when the power supply is turned off, the seat is released from the floor assembly.

2. The seat assembly of claim 1, wherein the electromagnetic rail further comprises a mounting flange projecting perpendicularly outward from the top side of the pair of sidewalls, a bottom surface of the floor panel being mounted on the mounting flange.

3. The seat assembly of claim 1, wherein the top side of the pair of sidewalls provides a support surface for the floor panel.

4. The seat assembly of claim 1, wherein the electromagnetic rail further comprises a reinforcement flange projecting perpendicularly outward from the bottom side of the pair of sidewalls.

5. The seat assembly of claim 1, further comprising a resonant inductive coupling power system for wirelessly supplying electrical power to the seat, the resonant inductive coupling power system comprising:
a transmit coil positioned in the floor assembly that generates an oscillating magnetic field;
a transmit coil power supply that supplies electricity to the transmit coil to generate the oscillating magnetic field; and
a receive coil positioned in the seat to receive magnetic energy from the oscillating magnetic field and convert the magnetic energy into electrical power for the seat.

6. A seat assembly, comprising:
a seal having an attachment post extending from a bottom of the seat, the attachment post comprising a ferromagnetic material;
a floor assembly including at least one floor panel and a electromagnetic rail positioned in the floor assembly to engage with the attachment post of the seat;
an electromagnetic coupling between the seat and the floor assembly comprising a plurality of magnetic coils wound around a portion of the electromagnetic rail and spaced apart along a length of the electromagnetic rail;
a power supply that supplies electricity to the plurality of magnetic coils to generate a magnetic field around the electromagnetic rail when the power supply is turned on to secure the seat to the floor assembly, and when the power supply is turned off, the seat is released from the floor assembly, and
a seat track having an open channel positioned within the floor assembly, the open channel of the seat track positioned to be exposed through the floor panel and the electromagnetic rail positioned within the open channel of the seat track.

7. The seat assembly of claim 6, wherein the attachment post of the seat is positioned in the open channel of the seat track and on top of the electromagnetic rail.

8. The seat assembly of claim 6, wherein the electromagnetic rail comprises:

a first rail and a second rail arranged to be spaced apart and separate from each other, the first rail and the second rail having an upper surface that engages with the attachment post of the seat; and
wherein the plurality of magnetic coils are wound separately around the first rail and the second rail at spaced intervals along the first rail and the second rail, and the power supply supplies electricity to the plurality of magnetic coils wound around the first rail and the second rail.

9. The seat assembly of claim 8, wherein the first rail and the second rail are positioned at a lower portion of the open channel, and the attachment post is positioned between the upper surface of the electromagnetic rail and a top of the seat track.

10. The seat assembly of claim 8, wherein the first rail and the second rail are positioned at a top of the open channel.

11. A vehicle, comprising:
a plurality of seats arranged in rows, one or more of the plurality of seats having an attachment post comprising a ferromagnetic material extending from a bottom thereof,
a floor assembly including at least one floor panel and an electromagnetic rail positioned in the floor assembly, the electromagnetic rail adapted to engage with the attachment post;
an electromagnetic coupling between one or more of the plurality of seats and the floor assembly, the electromagnetic coupling comprising a first plurality of magnetic coils wound around a portion of the electromagnetic rail and spaced apart along a length of the electromagnetic rail;
a seat track having an open channel positioned with the floor assembly, the open channel of the seat track positioned to be exposed through the floor panel and the electromagnetic rail positioned within the open channel of the seat track; and
a power supply that supplies electricity to the first plurality of magnetic coils to generate a magnetic field around the electromagnetic rail when the power supply is turned on to secure the one or more of the plurality of seats to the floor assembly, and when the power supply is turned off, the one or more of the plurality of seats are released from the floor assembly to permit the one or more of the plurality of seats to be removed to change an arrangement of or spacing between the rows of the plurality of seats.

12. The vehicle of claim 11, further comprising sensors that measure operational data of the vehicle and a controller that controls the power supply, the controller that receives the operational data from the sensors and is programmed to adjust a strength of the electromagnetic coupling based on the operational data from the sensors.

13. The vehicle of claim 11, wherein the electromagnetic rail comprises:
a pair of sidewalls having a top side and a bottom side, the pair of sidewalls arranged to be spaced apart and parallel;
a pair of lips projecting perpendicularly inwards from the top side of the pair of sidewalls, the pair of lips having a top engagement surface that engages with the attachment post of the seat; and
a plurality of crossbars connecting the bottom side of one of the pair of sidewalls to the bottom side of another of the sidewalls at regularly spaced intervals along the length of the electromagnetic rail, wherein the plurality of magnetic coils are wound around the crossbars.

14. The vehicle of claim 13, wherein the electromagnetic rail further comprises a mounting flange projecting perpendicularly outward from the top side of the pair of sidewalls, a bottom surface of the floor panel being mounted on the mounting flange.

15. A method of attaching seats to a floor of a vehicle having a seat track in the floor, the seat track having an open channel positioned to be exposed through the floor, the method comprising:

winding a plurality of magnetic coils around a portion of an electromagnetic rail and spacing the plurality of magnetic coils apart along a length of the electromagnetic rail;

positioning the electromagnetic rail within the open channel of the seat track;

supplying electricity to the plurality of magnetic coils in the electromagnetic rail to generate a magnetic field;

affixing an attachment post comprising a ferromagnetic material to a bottom of one or more of the seats; and positioning the attachment post on the electromagnetic rail; and supplying electricity to the electromagnetic rail such that the attachment post is magnetically attracted to the electromagnetic rail and the one or more of the seats are secured to the floor.

16. The method of claim 15, further comprising shutting off the electricity to the electromagnetic rail to release the one or more seats from the floor.

17. The method of claim 15, further comprising:
receiving operational data of the vehicle from one or more sensors; and
adjusting an amount of electricity supplied to the electromagnetic rail to adjust a strength of the magnetic field based on the operational data from the one or more sensors.

18. The method of claim 15, further comprising:
supplying an oscillating current to a transmit coil located in the floor to generate an oscillating magnetic field;
directing the oscillating magnetic field to a receive coil located in the one or more seats; and
converting the oscillating magnetic field directed to the receive coil into electrical power for the one or more seats.

* * * * *